(12) United States Patent
Rubino, Jr.

(10) Patent No.: US 6,584,259 B2
(45) Date of Patent: Jun. 24, 2003

(54) USE OF SOL-GEL AS AN INORGANIC ADHESIVE FOR HIGH STABILITY, SELF ORGANIZING, FIBER OPTIC ARRAY

(75) Inventor: Robert A. Rubino, Jr., Tolland, CT (US)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/135,264

(22) Filed: Apr. 30, 2002

(65) Prior Publication Data

US 2002/0186940 A1 Dec. 12, 2002

Related U.S. Application Data

(60) Provisional application No. 60/287,331, filed on Apr. 30, 2001.

(51) Int. Cl.[7] .............................. G02B 6/44; G02B 6/04
(52) U.S. Cl. ...................................... 385/115; 385/114
(58) Field of Search ........................ 385/115–121, 114

(56) References Cited

U.S. PATENT DOCUMENTS

| | | | |
|---|---|---|---|
| 3,713,729 A | 1/1973 | Inoue et al. ................ 385/115 |
| 4,547,040 A | 10/1985 | Yamamoto et al. ......... 385/143 |
| 4,783,135 A | 11/1988 | Utsumi et al. .............. 385/123 |
| 5,208,890 A | 5/1993 | Kohler et al. ............... 385/115 |
| 5,315,683 A | 5/1994 | Miller ........................ 385/136 |
| 5,653,777 A | 8/1997 | Semerdjian ................. 65/17.2 |
| 5,707,548 A | 1/1998 | King et al. ............... 252/301.4 |
| 5,822,072 A | 10/1998 | Dai et al. ................... 356/436 |
| 5,841,545 A | 11/1998 | Young ....................... 356/436 |
| 5,881,195 A | 3/1999 | Walker ....................... 385/116 |
| 5,991,493 A | 11/1999 | Dawes et al. .............. 385/141 |
| 6,054,217 A | 4/2000 | Szum et al. ................ 385/123 |
| 6,122,428 A | 9/2000 | Duecker .................... 385/115 |
| 6,240,230 B1 * | 5/2001 | Szum ......................... 385/100 |
| 6,455,607 B1 * | 9/2002 | Shustack .................... 385/114 |

\* cited by examiner

*Primary Examiner*—Brian Healy
*Assistant Examiner*—Kevin S Wood
(74) *Attorney, Agent, or Firm*—Volpe and Koenig, P.C.

(57) ABSTRACT

A fiber optic assembly comprising a plurality of optical fibers bonded together with an inorganic adhesive having a glass transition temperature of at least about 150° C. The inorganic adhesive preferably comprises a sol-gel, such a colloidal suspension of sodium silicate, that creates bond-lines between adjacent optical fibers that are less than about 200 nm in thickness.

15 Claims, 1 Drawing Sheet

USE OF SOL-GEL AS AN INORGANIC ADHESIVE FOR HIGH STABILITY, SELF ORGANIZING, FIBER OPTIC ARRAY

CROSS-REFERENCE TO RELATED APPLICATIONS

This application claims the benefit of U.S. Provisional Application No. 60/287,331, filed Apr. 30, 2001.

BACKGROUND

This invention pertains to the bonding of optical fibers along their lengths to form a self organized array, and to methods of making such assemblies into high density optical connectors and optical fanouts.

The bonding of optical fibers along their lengths to form hexagonal and cubic ordered arrays using organic adhesives has been demonstrated with less than optimal results. Alternatively, hexagonal and cubic ordered arrays of individual fibers have been heated, melted and drawn into fused arrays as well. However, in the case of fused arrays, separating the fibers into reliable individual elements that can be interconnected with standard telecommunications grade fiber is problematic. In the field of high density optical interconnects, what is needed is an ordered array of telecommunications grade fiber permanently bonded in a dense array of high positional tolerance on one end, and a "fan-out" of individual fibers (or ribbons of fibers) on the other.

One approach to realize this configuration, is to use an organic adhesive, such as epoxy, to bond the fiber array along the lengths of the individual fibers. As a convenient and low cost solution, epoxies have many additional advantages, not the least of which is their low viscosity (important for high dimensional precision, i.e. thin bond line), strength, toughness and ease of application. However, irrespective of cure technique (UV, thermal, etc.), epoxies have modest glass transition temperatures ($T_g$) in which their mechanical properties are better described as visco-fluidic rather than solid. Unfortunately, the transition between fluidic and solid is more or less a continuum in which the onset of undesirable visco-fluidic characteristics of the epoxy can occur at temperatures significantly below that of the $T_g$. This in turn can lead to bonded parts of poor dimensional stability at environmental temperatures significantly below the $T_g$ of the adhesive.

In addition to the issue of dimensional instability, the high thermal coefficients of expansion (TCE) of epoxies, in particular for temperatures approaching the $T_g$ (typically ~125° C.) whereby the TCE in general increases threefold, can cause mechanical reliability concerns of the optical fiber itself.

For these reasons of performance and mechanical reliability, the telecommunications industry has shown reluctance in fielding systems which make use of organic adhesives in "mission critical" components.

There is a need to produce a bonded fiber array with acceptable performance and mechanical reliability for use in the telecommunications industry.

SUMMARY

The one respect, the invention comprises a fiber optic assembly comprising a plurality of optical fibers. An inorganic adhesive having a glass transition temperature of at least about 150° C. bonds each fiber to at least one other fiber along a bondline.

In another respect, the inorganic adhesive preferably comprises a sol-gel having a glass transition temperature of at least about 150° C. and the bondlines between adjacent optical fibers in the array are less than about 200 nm in thickness.

In yet another respect, the invention comprises a fiber optic assembly comprising a plurality of optical fibers bonded together along a plurality of bondlines by an inorganic adhesive. The bondlines correspond to lines of contact between each of the optical fibers. The inorganic adhesive is preferably formed from a colloidal suspension of sodium silicate.

BRIEF DESCRIPTION OF THE DRAWING(S)

The foregoing summary, as well as the following detailed description of the preferred embodiments of the invention, would be better understood when read in conjunction with the appended drawings. For the purpose of illustrating the invention, two preferred embodiments of the invention are shown. It is understood, however, that the invention is not limited to the precise arrangement and instrumentalities shown.

DETAILED DESCRIPTION OF THE PREFERRED EMBODIMENT(S)

Figure 1:
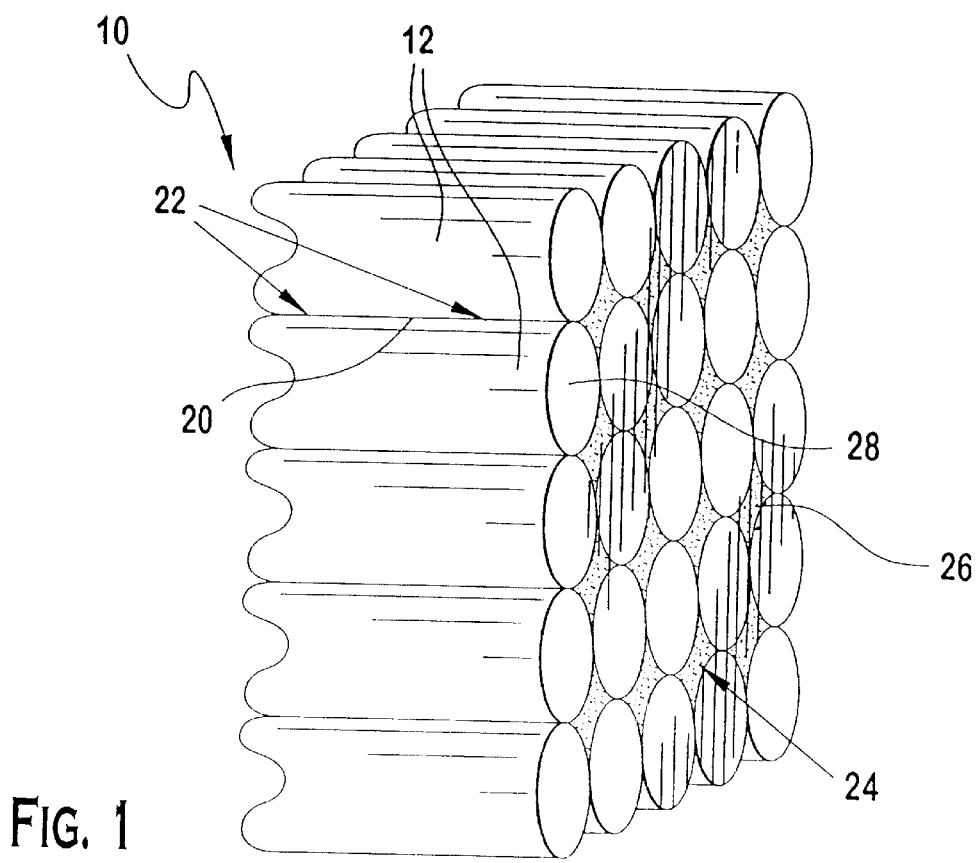
FIG. 1 shows a side perspective view of a twenty-five (25) fiber cubic array in conformance with the present invention.

Referring to FIG. 1, wherein like numerals designate like elements throughout, there is shown a rectangular fiber array 10 which has been formed by sol-gel bonding. In FIG. 1, twenty five (25) optic fibers 12 are positioned in a rectangular fiber array. However, as will be recognized by those skilled in the art, any size M×N array could be used. Adjacent optical fibers 12 are bonded together along bondlines 22. The bondlines 22 correspond to lines of contact between adjacent optical fibers 12.

As will be discussed in greater detail below, a sol-gel 20 is used to bond the optical fibers 12. In general, the sol-gel process involves the transition of a solution system from a liquid colloidal "sol" into a solid "gel" phase. In a typical sol-gel gel process, the precursor is subjected to a series of hydrolysis and polymerization reactions to form the "sol." When the "sol" is partially dried, a "wet gel" will form. With further drying and heat treatment, the "gel" is converted into a dense material. With proper activation of the silica of the outer diameter of the optical fibers 12 and special attention during the drying process, chemical bonds are formed between the bonding surfaces, yielding a dense chemical bond.

The formation of the assembly 10 will now be discussed in detail. Before bonding, the bonding surfaces of the optical fibers 12 are preferably cleaned with a cleaning agent, such as methanol, then "activated" using any suitable technique known in the art, such as wet chemistry, plasma, or flame activation. Application of an activation solution of three (3) molal potassium hydroxide is the preferred technique because it minimizes the risk of damage to the optical fibers 12. The optical fibers 12 are then placed in intimate contact, using any suitable method, such as clamping.

Once the optical fibers 12 are in intimate contact, the sol-gel solution is then introduced into the interstitial cavities 24 between adjacent optical fibers 12 using a precision micro-dispenser. Any suitable sol-gel formulation can be used. For example, a solution of sodium silicate, containing about 14% NaOH and 27% $SiO_2$ and de-ionized water has been found to work well in this application. The preferred concentration of sodium silicate in the sol-gel 20 is 3–14% (by weight), although concentrations of 45% are suitable. Concentrations above 45% sodium silicate require special process steps to avoid precipitation of the suspension.

In the interest of clarity, only two optical fibers 12 and the associated bondline 22 are labeled in FIG. 1. It should be understood that the features described with respect to the optical fibers 12 labeled in FIG. 1 apply to all twenty-five (25) of the optical fibers 12.

The sol-gel is 20 then cured using any suitable method including but not limited to, thermal or laser curing. Preferably, the temperature during the curing process does not exceed about 150° C. A sol-gel 20 prepared and cured according to the process outlined above will have a glass transition temperature well in excess of 150° C.

After the sol-gel has cured, the interstitial cavities 24 between the optical fibers 12 are preferably filled with a cross-linking filler, such as an epoxy 26. The primary purpose for the use of epoxy 26 is to prevent ingress of moisture and/or contaminants into the interstitial cavities 24. Such ingress could cause, among other things, corrosion of the sol-gel chemical bonds under severe environment. Due to the very small size of the interstitial cavities 24 (typically about 30 microns in diameter) the epoxy 26 must be wicked into the interstitial cavities 24, then heat-treated and subjected to a vacuum to remove trapped air.

After the epoxy 26 has cured, the face 28 of the fiber optic assembly 10 is preferably ground and/or polished to provide a clean, smooth contact surface for bonding with other optical devices, such as a waveguide, for example.

Figure 2:
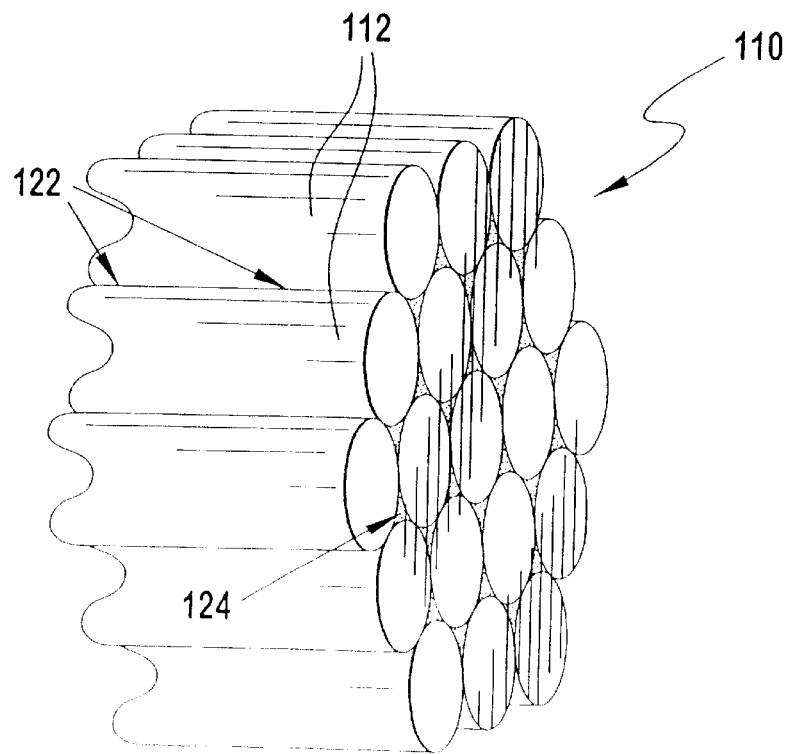
FIG. 2 shows a nineteen (19) fiber hexagonal array in conformance with the present invention.

Referring to FIG. 2, a hexagonal fiber array 110 in accordance with the present invention is shown. Optic fibers 112 are located in a hexagonal arrangement for use in optical signal transport devices. As was the case with assembly 10, a sol-gel adhesive 120 is placed in interstitial spaces 124 between the optical fibers 112 and cured to bond the optic fibers along bondlines 122, using a process similar to the process used to form assembly 10.

Although shown as hexagonal or rectangular in shape, those skilled in the art will recognize that the use of sol-gel adhesive to bind optic fibers may be done in various geometric formations for the optic fibers, and the embodiments shown do not limit the applicability of this technique to the shown geometric configurations. Additionally, greater or lesser number of optic fibers may be employed in the formation of a geometric shape using the sol-gel adhesive.

While the preferred embodiments of the invention have been described in detail, this invention is not limited to the specific embodiments described above, which should be considered as merely exemplary. Further modifications and extensions of the present invention may be developed based upon the foregoing, and all such modifications are deemed to be within the scope of the present invention.

What is claimed is:

1. A fiber optic assembly comprising:
   a plurality of optical fibers;
   a bondline between each of the plurality of optical fibers and at least one other of the plurality of optical fibers, the bondline comprising an inorganic adhesive having a glass transition temperature of at least about 150° C.

2. The assembly of claim 1, wherein the inorganic adhesive is a sol-gel.

3. The assembly of claim 2, wherein the inorganic adhesive is sodium silicate.

4. The assembly of claim 3, wherein the sol-gel is about 14% NaOH and about 27% $SiO_2$.

5. The assembly of claim 1, wherein the plurality of optical fibers comprises a hexagonal array optical fibers.

6. The assembly of claim 1, wherein the plurality of optical fibers comprises a rectangular fiber array.

7. The assembly of claim 1, further comprising at least one interstitial cavity located between at least three adjacent optical fibers of the plurality of optical fibers, the interstitial cavity being filled with an organic coating.

8. The assembly of claim 7, wherein the organic coating comprises an epoxy.

9. The assembly of claim 1, wherein the bondline is less than about 200 nm in thickness.

10. A fiber optic assembly comprising:
    a plurality of optical fibers, each of the plurality of optical fibers being bonded to at least one other of the plurality of optical fibers along a bondline;
    wherein the bondline is less than about 200 nm in thickness and comprises a sol-gel having a glass transition temperature of at least about 150° C.

11. The assembly of claim 10, wherein the sol-gel is sodium silicate.

12. The assembly of claim 11, wherein the sol-gel is about 14% NaOH and about 27% $SiO_2$.

13. A fiber optic assembly comprising:
    a plurality of optical fibers bonded together along a plurality of bondlines by an inorganic adhesive, the bondlines corresponding to lines of contact between each of the plurality of optical fibers, wherein the inorganic adhesive is formed from a colloidal suspension of sodium silicate.

14. The assembly of claim 13, wherein the colloidal suspension of sodium silicate comprises about 14% NaOH and about 27% $SiO_2$.

15. The assembly of claim 14, wherein the bondline is less than about 200 nm in thickness.

* * * * *